United States Patent [19]

Linsi

[11] Patent Number: 4,655,038
[45] Date of Patent: Apr. 7, 1987

[54] EXHAUST GAS TURBO-CHARGER TURBINE

[75] Inventor: Ulrich Linsi, Zürich, Switzerland

[73] Assignee: BBC Brown, Boveri & Company, Limited, Baden, Switzerland

[21] Appl. No.: 823,539

[22] Filed: Jan. 29, 1986

[30] Foreign Application Priority Data

Feb. 20, 1985 [CH] Switzerland ............................ 771/85

[51] Int. Cl.$^4$ ............................................. F02D 23/00
[52] U.S. Cl. ........................................ 60/602; 415/39; 415/151
[58] Field of Search ................. 60/600, 601, 602, 603; 415/28, 39, 145, 151

[56] References Cited

U.S. PATENT DOCUMENTS 3,270,495  9/1966  Connor ................................... 60/602
4,406,125  9/1983  Rahnke ................................... 60/602
4,512,714  4/1985  Kaesser ................................. 415/151
4,586,336  5/1986  Hörler ................................... 60/602

Primary Examiner—Stephen F. Husar
Attorney, Agent, or Firm—Burns, Doane, Swecker & Mathis

[57] ABSTRACT

An exhaust gas turbo-charger for internal combustion engines of the type having turbine rotor blades rotatable about an axis and a vaned guide device located upstream of turbine rotor blades, which vaned guide device includes a butterfly valve, a main guide vane ring and an auxiliary guide vane ring. Each guide vane ring is provided with a mutually separate supply duct, and the butterfly valve controls exhaust gas flow to the auxiliary guide vane ring. The auxiliary guide vane ring is located radially inside of the main guide vane ring and the butterfly valve is located upstream of the auxiliary guide vane ring.

7 Claims, 2 Drawing Figures

EXHAUST GAS TURBO-CHARGER TURBINE

FIELD OF THE INVENTION

The present invention relates to exhaust gas turbo-chargers for internal combustion engines generally and more particularly, to exhaust gas turbo-charger turbines having an auxiliary turbine inlet duct.

BACKGROUND OF THE INVENTION

In internal combustion engines, the exhaust gas turbo-charger is used to increase the power. in many applications with variable engine speed (for example ship and vehicle propulsion), it is desirable to have a high boost pressure at part speed. Various arrangements are known for relatively increasing the boost pressure at partial-load compared with boost at the full load operating point, such as the use of a turbine with especially narrow flow cross-sections such an arrangement makes it possible to increase the boost pressure over the whole operating range. In order to ensure that the boost pressure at full load does not exceed a permissible value, either a part of the boost air is blown off to atmosphere downstream of the compressor or part of the exhaust gases is blown off to atmosphere upstream of the turbine at high power levels. The disadvantage of this solution is that blowing off high pressure air or gas in effect lowers turbo-charger efficiency and consequently increases fuel consumption.

Another possibility for achieving a relative increase in the boost pressure at partial load is provided by the use of adjustable turbine guide vanes. Adjustable guide vanes make it possible to have a large turbine cross-section at full load and a smaller turbine cross-section at partial load. The disadvantages of this solution is that the adjustment of a large number of guide vanes (18 to 36 vanes, for example) is mechanically very complicated and has poor operational reliability, particularly when the turbo-charger turbine is driven by the exhaust gases of a diesel engine operating on heavy oil. The danger exists of the movable guide vanes being eroded by hard soot particles or the movement of the guide vanes being prevented by deposits of incompletely burned fuel particles.

Exhaust gas turbines are known from DE No. 2,934,041 C2 and DE No. 3,346,472 A1 in which various ducts undertake the flow of the rotor blades as a function of load. These turbines, however, all have vaneless guide arrangements.

A turbine known from EP No. 0,093,462 A1 is equipped with an axially adjustable annular slide for changing the turbine cross-section, the annular slide being located between the turbine distributor and the turbine guide vanes. The result, however, is that the exhaust gas flow is led to the rotor blade tips at part load, i.e. to the point where the centrifugal effect of the exhaust gas flow is at a maximum. Consequently there is, the imminent danger that the small flow cross-section will be plastered up by soot particles.

This design also involves the end surface of the annular slide being designed so as to be free from separation which, when the design is based on a variable exhaust gas flow, can lead to non-optimum design compromises.

OBJECTS AND SUMMARY OF THE INVENTION

An object of the present invention is to provide a remedy on this point. More specifically, the present invention, has the objective of reducing the boost pressure at full load in an exhaust gas turbo-charger for internal combustion engine, without specifying turbine efficiency.

The present invention achieves these and other objects by providing an exhaust gas turbo-charger for internal combustion engines of the type having turbine rotor blades rotatable about an axis and a vaned guide device located upstream of turbine rotor blades, which vaned guide device includes a butterfly valve, a main guide vane ring and an auxiliary guide vane ring. Each guide vane ring is provided with a mutually separate supply duct, and the butterfly valve controls exhaust gas flow to the auxiliary vaned guide ring. The exhaust gas turbo-charger also includes the improvement of the auxiliary guide ring being located radially inside of the main guide vane ring and the butterfly valve being located upstream of the auxiliary guide vane ring.

The main advantage of the invention is that the turbine is driven via the main guide ring only at partial load of the internal combustion engine. It is only at full load that the butterfly valve is opened, by which the exhaust gas flow branched off at the valve is also led to the turbine via the auxiliary guide ring, which is connected in parallel with the main guide ring. Because the main guide ring, with its larger flow cross-section relative to the auxiliary guide ring, is located in the outer flow duct, there is no longer any further danger of the flow cross-section being plastered up by soot particles. Furthermore, there are no moving parts in the immediate vicinity of the guide vanes so that the danger of coking of an adjustment device is not a problem either. In addition, inspection and cleaning can be more easily performed upon the butterfly valve of the present invention than upon an adjustment device in the region of the guide vanes and rotor blades.

In a preferred embodiment of the invention, the auxiliary guide ring is so arranged that, at part load, the flow in the turbine is not substantially disturbed by the closing of the auxiliary guide ring supply duct. This result is achieved by the inner meridian contour of the main guide ring being located substantially in the extrapolation of the inner meridian contour of the turbine rotor blades, so that the latter can be arranged to provide small deflections, depending upon the design of the exhaust gas turbo-charger turbine.

BRIEF DESCRIPTION OF THE DRAWING

Preferred embodiments of the invention are shown diagrammatically in the drawing, wherein.

All the elements not necessary for an understanding of the invention have been omitted. The flow direction of the exhaust gases is indicated by arrows. In the two figures, the same elements are provided with the same reference designations.

DETAILED DESCRIPTION OF THE PREFERRED EMBODIMENTS

Figure 1:
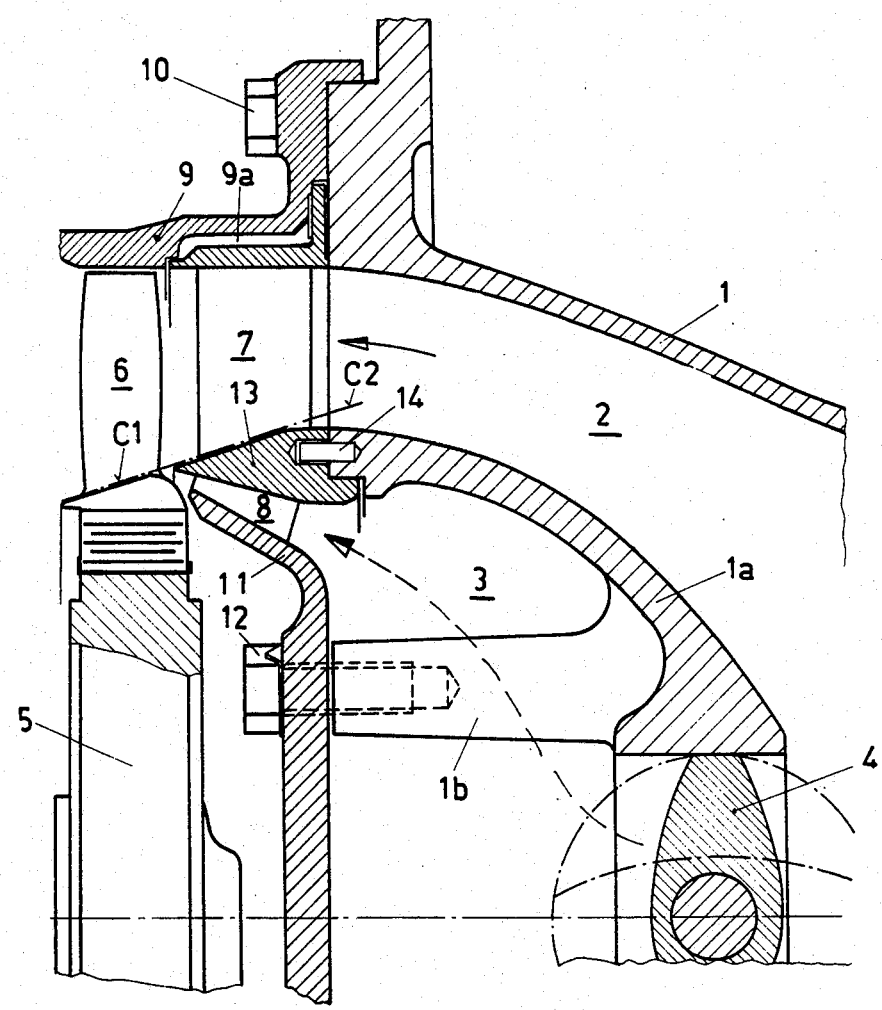
FIG. 1 is a cross-sectional view of an axial exhaust gas turbo-charger turbine according to a preferred embodiment of the present invention, having main and auxiliary guide rings and a butterfly valve installed upstream thereof

Referring to FIG. 1, the exhaust gas flow is divided by a partition 1a in the casing 1. A butterfly valve 4 located upstream in the gas inlet casing is supported in a thickening of the partition 1a. The bufferfly valve 4 is shown in the closed position, which directs all of the exhaust gas flow through the main duct 2. The terminus of the main duct 2 is formed on the downstream side by a main guide ring 7 which comprises a number of fixed guide vanes. On the outside of the main duct, the main guide ring 7 is located between the casing 1 and a turbine stationary shroud ring 9, the latter having—in the radial direction—a recess 9a corresponding with the external contour of the main guide ring 7, by which the external flow walls of the main duct 2, the main guide ring 7 and the turbine shroud ring 9 can be accommodated within one another in such a way that the flow in this region is not disturbed. In the axial direction, on the other hand, the recess 9a is adapted such that the main guide ring 7 is held between the casing 1 and the turbine stationary shroud ring 9 and is fixed by bolts 10.

A ring 13, provided between the parallel connected main guide ring 7 and the auxiliary guide ring 8, is droplet shaped and forms an ideal flow transition between the two inlet ducts 2 and 3 and the turbine rotor blade 6. This ring 13 is a part of the main guide ring 7 in the present embodiment. The auxiliary guide ring 8 is located on a smaller diameter than the main guide ring 7, i.e. within the main guide ring. The main guide ring 7 is positioned on a downstream thickening of the partition 1a by a centering dowel 14 which engages the ring 13. The vanes of the auxiliary guide ring 8 can be fastened either to the ring 13 or to the wall 11. An internal wall 11 terminates the auxiliary duct 3. Wall 11 it is fastened by bolts 12 to several ribs 1b, which protrude from the partition 1a axially and transversely to the flow direction in the auxiliary duct 3.

A turbine rotor 5 carries a number of turbine blades 6 on its periphery. The auxiliary guide ring 8 is so arranged that the exhaust gas flow to the rotor blades 6 is not substantially disturbed by the closing of the butterfly valve 4. This is achieved in that the inner meridian contour C2 of the main guide ring 7 is substantially located in the extrapolation of the inner meridian contour C1 of the turbine rotor blade 6.

Figure 2:
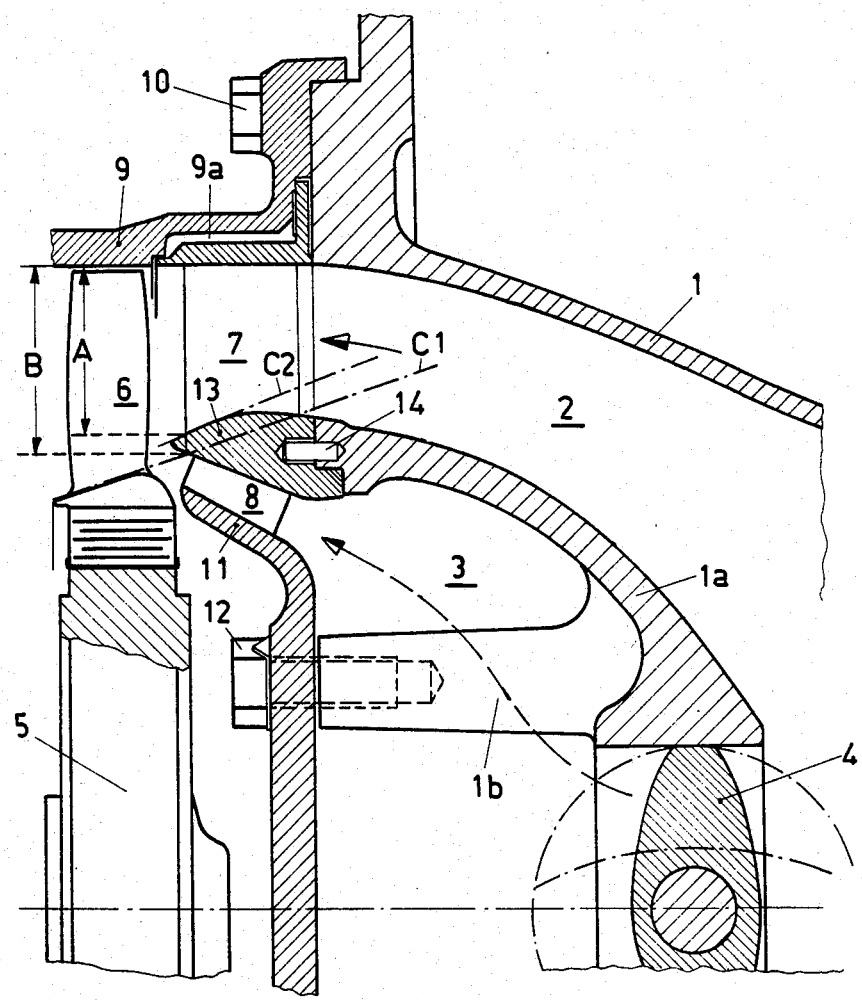
FIG. 2 is a cross-sectional view exhaust gas turbo-charger turbine according to another preferred embodiment of the present invention having different inner meridian contours for the guide vanes and rotor blades.

If a larger flow opening in the auxiliary guide vane 8 is required at full load, the two meridian contours C1, C2 are arranged to be somewhat displaced relative to one another, as shown in FIG. 2. However, the displacement of the two meridian contours C1, C2 relative to one another must be kept within narrow limits if the flow through the rotor blades is not to be substantially disturbed. A measure for this is provided by the ratio of the radial openings A, B at the intersection of the inner meridian contours C1, C2 with the outlet edge of the main guide ring 7. The opening A should be equal to or greater than 70% of the opening B, with a maximum of 110%.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. In an exhaust gas turbo-charger for internal combustion engines of the type having a vaned guide device located upstream of turbine rotor blades, said turbine rotor blades being rotatable about an axis, said vaned guide device including a main guide vane ring and an auxiliary guide vane ring with mutually separate supply ducts, and butterfly valve means for controlling exhaust gas flow to the auxiliary vaned guide rings, the improvement comprising the auxiliary guide vane ring being located radially inside of the main guide vane ring and the butterfly valve means being located upstream of the auxiliary guide vane ring.

2. The exhaust gas turbo-charger according to claim 1, wherein an inner meridian contour of the main guide vane ring is located substantially in an extrapolation of the inner meridian contour of the rotor blades.

3. The exhaust gas turbo-charger according to claim 2, wherein a first radial opening resulting at an intersection of the inner meridian contour of the main guide vane ring and a downstream edge of the main guide vane ring is in the range of 85% and 110% of a second radial opening at an intersection of the inner meridian contour of the rotor blades and the downstream edge of the main guide vane ring.

4. The exhaust gas turbo-charger according to claim 1, wherein the butterfly valve is located centrally in a gas inlet casing of the exhaust gas turbo-charger.

5. The exhaust gas turbo-charger according to claim 1, wherein said auxiliary guide vane ring and said main guide vane ring are adapted to direct the exhaust gases axially toward said turbine rotor blades and said main guide vane ring is larger than said auxiliary guide vane ring.

6. The exhaust gas turbo-charger according to claim 5, wherein said supply duct for the auxiliary guide vane ring is radially inside of the supply duct for the main vane ring and said butterfly valve is located within said radially inside supply duct, said butterfly valve adapted to open and close said radially inside supply duct.

7. The exhaust gas turbo-charger according to claim 6, wherein said turbine rotor blades include axial-flow rotor blades.

* * * * *